(12) United States Patent
Adams

(10) Patent No.: US 11,526,846 B2
(45) Date of Patent: Dec. 13, 2022

(54) RECEIPT CONTENT CAPTURE DEVICE FOR INVENTORY TRACKING

(71) Applicant: Maplebear, Inc., San Francisco, CA (US)

(72) Inventor: Robert Russel Adams, Chicago, IL (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/191,601

(22) Filed: Mar. 3, 2021

(65) Prior Publication Data
US 2022/0284379 A1    Sep. 8, 2022

(51) Int. Cl.
| | |
|---|---|
| G06Q 10/08 | (2012.01) |
| G06Q 20/20 | (2012.01) |
| G06Q 40/00 | (2012.01) |
| G06F 16/25 | (2019.01) |
| G06Q 20/04 | (2012.01) |
| G06Q 30/06 | (2012.01) |

(52) U.S. Cl.
CPC ......... *G06Q 10/087* (2013.01); *G06F 16/258* (2019.01); *G06Q 20/047* (2020.05); *G06Q 20/209* (2013.01); *G06Q 40/12* (2013.12); *G06Q 30/0603* (2013.01)

(58) Field of Classification Search
None
See application file for complete search history.

(56) References Cited

U.S. PATENT DOCUMENTS

| | | | |
|---|---|---|---|
| 9,665,855 B2 * | 5/2017 | Brooks | G06Q 30/06 |
| 10,223,730 B2 * | 3/2019 | Shastry | G06Q 30/0631 |
| 11,042,953 B1 * | 6/2021 | Delgado | G06T 7/0008 |
| 2003/0208403 A1 * | 11/2003 | Fisher | G06Q 30/0238 717/117 |
| 2004/0117265 A1 * | 6/2004 | Hoffman | G06Q 20/20 705/23 |
| 2005/0211762 A1 * | 9/2005 | Dodson | G06Q 20/20 235/379 |
| 2006/0157560 A1 * | 7/2006 | Skor | G07F 7/00 235/381 |
| 2007/0050229 A1 * | 3/2007 | Tatro | G06Q 50/12 705/15 |
| 2008/0147557 A1 * | 6/2008 | Sheehy | G06Q 30/0603 705/58 |
| 2011/0307318 A1 * | 12/2011 | LaPorte | G06Q 30/0207 705/14.33 |

(Continued)

*Primary Examiner* — Fateh M Obaid
(74) *Attorney, Agent, or Firm* — Fenwick & West LLP

(57) ABSTRACT

A receipt capture device can collect transaction information from transactions conducted at a point of sale system by capturing receipt data transmitted from the point of sale system for the purpose of printing receipts at an external receipt printer. The receipt capture device can then send the collected receipt data to an online system for analysis. At the online system, received receipt data can be decoded from the printer-readable format it is transmitted in and used to enhance the online system's understanding of transactions occurring at a retailer associated with the point of sale system. For example, the online system can determine an approximate inventory of items available at purchase at the retailer by aggregating items recently purchased in transactions at the point of sale system.

20 Claims, 10 Drawing Sheets

(56) References Cited

U.S. PATENT DOCUMENTS

| | | | |
|---|---|---|---|
| 2014/0025515 A1* | 1/2014 | Argue | G06Q 20/322 |
| | | | 705/21 |
| 2014/0025516 A1* | 1/2014 | Argue | G06Q 20/3278 |
| | | | 705/21 |
| 2014/0025517 A1* | 1/2014 | Argue | G06Q 20/3278 |
| | | | 705/21 |
| 2016/0012465 A1* | 1/2016 | Sharp | G06Q 20/386 |
| | | | 705/14.17 |
| 2016/0239733 A1* | 8/2016 | Hertz | H04W 4/02 |
| 2019/0228374 A1* | 7/2019 | Hicks | G06Q 20/204 |
| 2020/0265387 A1* | 8/2020 | Ave | G06Q 10/1095 |
| 2020/0279217 A1* | 9/2020 | Gravelle | G06Q 10/0835 |
| 2021/0192660 A1* | 6/2021 | Delgado | G06Q 50/28 |

\* cited by examiner

Date and Time
520

Price Information
540

Purchase Total
550

Payment Information
560

Donny's Grocery
123 Main Street

8/7/2021                3:37 PM

3    APPLE            x3 @0.99
     2830919270002        $2.97

1    POTATO CHIPS
     45367760009          $2.50

TOTAL:                  $37.54
PAYMENT TYPE: CREDIT CARD
: xxxx xxxx xxxx 1000
          *APPROVED*
CHANGE DUE:              $0.00

Product Identification
530

Receipt
510

RECEIPT CONTENT CAPTURE DEVICE FOR INVENTORY TRACKING

BACKGROUND

This disclosure relates generally to capturing and analyzing receipt data transmitted from a point of sale system to a receipt printer.

In current online systems and mobile applications, a customer creates an order of items to be purchased from a retailer. To facilitate the customer's shopping experience, the online system or mobile application may present items in an online catalog of items available at a retailer to the customer, who may select items to add to the order. However, a retailer's online catalog of items needs to be initially created and updated to reflect changes in the retailer's product offerings (such as seasonal or new products). For smaller or independent retailers, this can be a significant task, especially where detailed tracking and updating of current product inventory and availability is not already part of their business. Therefore, the bookkeeping and overhead involved in generating and maintaining a current product catalog can present a barrier to entry for small retailers making their products available through online services and for online services to products or services stocked by small retailers to their platforms.

SUMMARY

A receipt capture device can collect transaction information from transactions conducted at a point of sale system by capturing receipt data transmitted from the point of sale system for the purpose of printing receipts at an external receipt printer. The receipt capture device can then send the collected receipt data to an online system for analysis. To preserve the functionality of the point of sale, the receipt capture device then retransmits the receipt data to the receipt printer for the receipt for the transaction to be printed as normal. At the online system, received receipt data can be decoded from the printer-readable format it is transmitted in and used to enhance the online system's understanding of transactions occurring at a retailer associated with the point of sale system. For example, the online system can determine an approximate inventory of items available at purchase at the retailer by aggregating items recently purchased in transactions at the point of sale system. This allows the online system and/or the retailer to automatically determine and maintain an available product inventory for the retailer without resorting to manual logging of current stock levels or purchases into the product inventory.

Additionally, an online system can confirm the contents of specific transactions occurring at the point of sale system. The online system can match transaction information from captured receipt data (such as an authorization code or partial credit card number and time of purchase) with information about a known transaction occurring at the retailer. If discrepancies exist between the sources of transaction information (for example, if the list of products purchased in the transaction doesn't match between the two sources), the online system can take corrective action to address the discrepancy.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF DRAWINGS

FIG. 5 illustrates an example receipt, according to one embodiment.

Figure 1:
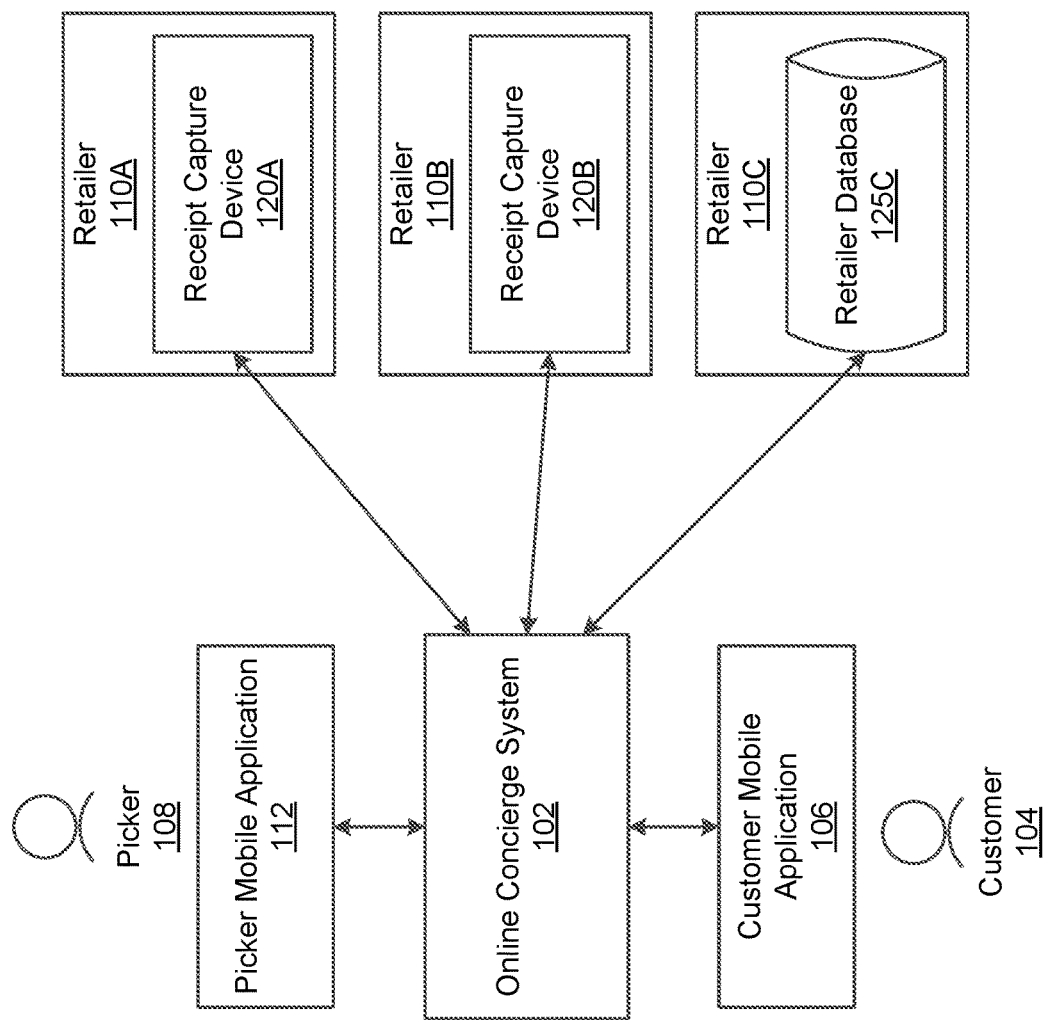
FIG. 1 illustrates the environment of an online concierge system receiving information from retailers, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein. The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A," "110B," and/or "110C" in the figures.

DETAILED DESCRIPTION

System Environment

FIG. 1 illustrates the environment 100 of an online concierge system 102, according to one embodiment. The environment 100 of FIG. 1 includes an online concierge system 102, a customer 104 using a customer mobile application 106, a picker 108 using a picker mobile application 112, and several retailers 110A, 110B, and 110C. Each retailer 110 transmits inventory information to the online concierge system 102 via a receipt capture device 120 and/or retailer database 125. In the environment 100, retailer 110A uses a receipt capture device 120A, retailer 110B uses a receipt capture device 110B, and retailer 110C has a retailer database 125.

In the environment 100, the online concierge system 102 is configured to receive orders from one or more customers 104 (FIG. 1 shows only one customer 104 for the sake of simplicity). A customer 104 can be a user of the online concierge system 102 able to place orders with the online concierge service 102. In some implementations, an order specifies a list of goods (items or products) to be delivered to the customer 104. An order can also specify the location to which the goods are to be delivered, and a time window during which the goods should be delivered. In some embodiments, the order specifies one or more retailers 110 from which the selected items will be sourced. A customer 104 may use the customer mobile application (CMA) 106 to place the order; the CMA 106 is configured to communicate with the online concierge system 102.

In some implementations, the online concierge system 102 allows customers to purchase food items, ingredients, and/or other goods from the inventories of one or more retailers 110. Customers 104 can select items to purchase through a browsing or shopping user interface of the customer mobile application 106. The online concierge system 102 can be further configured to transmit orders received from customers 104 to one or more pickers 108. A picker 108 may be a contractor, employee, or other person (or entity) who is enabled to fulfill orders received by the online concierge system 102. For simplicity, the FIG. 1 shows three retailers, 110A, 110B, and 110C (however, an environment could include hundreds of retailers 110). The retailers 110 may be physical retailers, such as grocery stores, discount stores, department stores, etc., or non-public warehouses storing items that can be collected and delivered to customers 104. Each picker 108 fulfills an order received from the online concierge system 102 at one or more retailers 110, delivers the order to the customer 104, or performs both fulfillment and delivery. In some implementations, pickers 108 fulfill orders in part by purchasing ordered items at retailers 110 (a "fulfillment purchase") using a payment method associated with the online concierge system 102, such as a credit or debit card associated with the online concierge system 102 (an "OCS payment method"). In one embodiment, pickers 108 make use of a picker mobile application 112 which is configured to interact with the online concierge system 102.

In some embodiments, some retailers 110 are independent from each other and are each associated with their own inventory. For example, a retailer 110A can be an independent grocery store and another retailer 110B can be a local butcher shop. However, the online concierge system 102 may need to determine product catalogs and current inventory levels for all the retailers 110 in order to present an up-to-date list of available products to customers 104. In some cases, a retailer 110 is able to directly provide accurate inventory information to the online concierge system 102. For example, many multi-location or chain retailers use sophisticated inventory management systems including databases of products and stock levels at each location of that retailer. For example, the retailer 110C can use the retailer database 125C (storing inventory information for the retailer 110C) as part of an existing inventory management system. In these cases, the retailer 110C may periodically provide information from the retailer database 125C (such as lists of current available products) to the online concierge system 102 as needed.

However, other retailers 110 may not have access to existing inventory management databases such as the retailer database 125C for the online concierge system 102 to tap for inventory data. Instead, independent retailers 110 may use other methods for managing inventory at the retailer 110 that are not as easy to interface with the online concierge system 102, such as tracking available products on paper or using other manual methods of tracking current inventory. In some implementations, the online concierge system 102 can provide retailers with a receipt capture device 120 that can refer receipt data generated for transactions conducted at the retailer 110 to the online concierge system 102. In some implementations, the online concierge system 102 can use the receipt data to estimate a product catalog, currently available products, or other information for the associated retailer 110.

In other implementations, receipt capture devices 120 and the use of captured receipt data can be incorporated into other systems (other than an online concierge system 102), for example a standalone website or inventory management system for a retailer 110. Receipt capture devices will be discussed in further detail in relation to FIG. 4.

Online Concierge System

Figure 2:
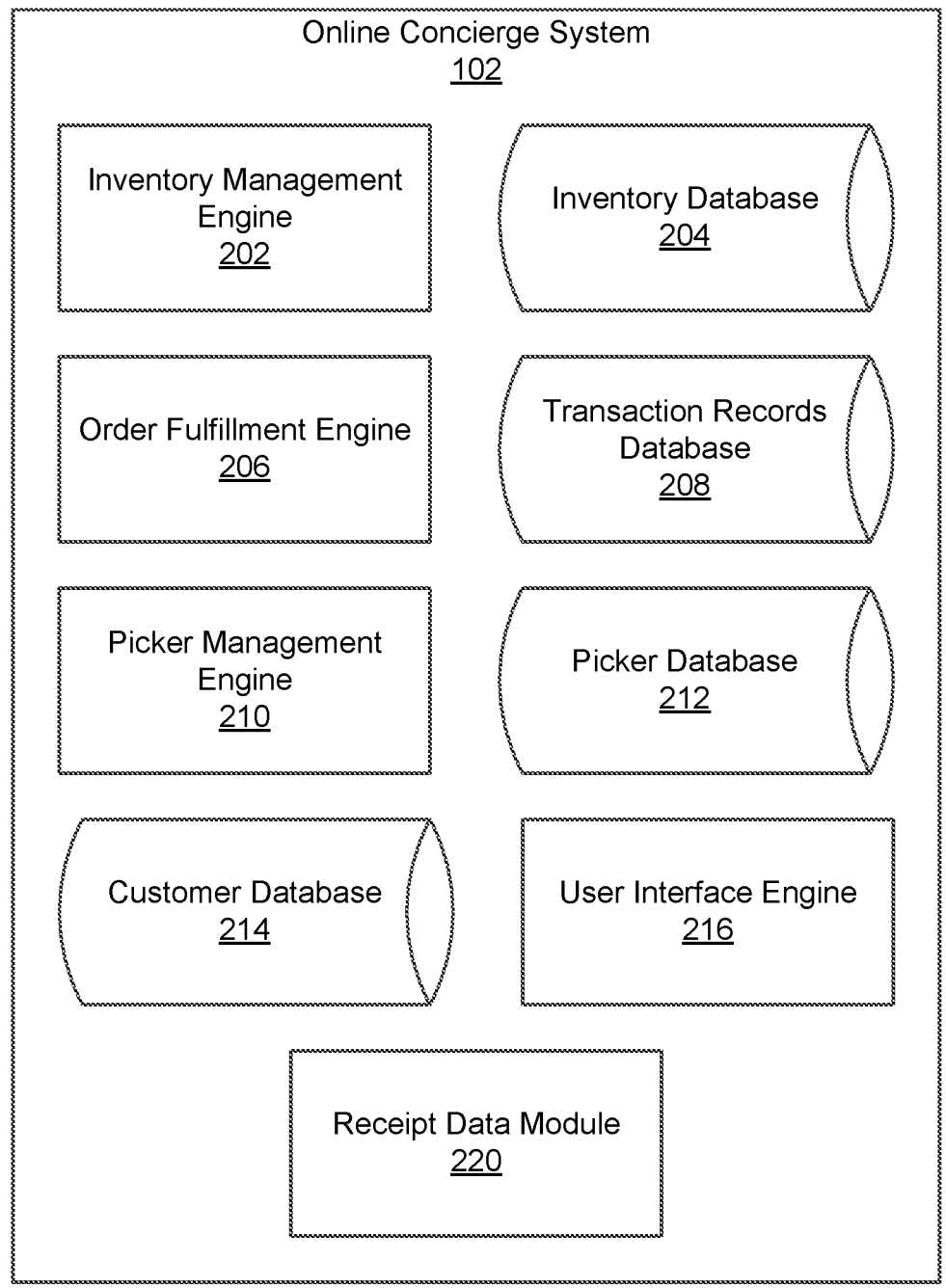
FIG. 2 is a block diagram of an online concierge system, according to one embodiment.

FIG. 2 is a block diagram of an online concierge system 102, according to one embodiment. The online concierge system 102 includes an inventory management engine 202, which interacts with inventory systems associated with retailers 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information stored in the inventory database 204 can include both qualitative and quantitative information about items available through the online concierge system 102, including size, color, weight, SKU, serial number, and so on. In one embodiment, the inventory database 204 also stores purchasing rules associated with each item, if they exist. For example, age-restricted items such as alcohol and tobacco may be flagged accordingly in the inventory database 204.

The online concierge system 102 also includes an order fulfillment engine 206 which is configured to manage orders made by customers 104 (for example, via the customer mobile application 106). The order fulfillment engine 206 is also configured to access the inventory database 204 in order to determine which products are available at which retailers 110 and can determine a sale price for each item ordered by a customer 104. The order fulfillment engine 206 also facilitates transactions associated with each order. In one embodiment, the order fulfillment engine 206 charges a payment instrument associated with a customer 104 when he/she places an order and may transmit payment information to an external payment gateway or payment processor. The order fulfillment engine 206 stores payment and transactional information associated with each order in a transaction records database 208. For example, a record of an order stored in the transaction records database 208 can include information about the contents, date, and price of the order, for example an identification of a customer 104 placing the order and the picker 108 filling the order, a list of items included in the order (and corresponding prices), a total price of the order, information about the retailer(s) where the items were sourced from, and dates that the order was placed and fulfilled. Similarly, the transaction records database 208 may also include similar information about transactions made by pickers 108 when fulfilling one or more orders at retailers 110.

In some embodiments, the order fulfillment engine 206 also shares order details with retailers 110 associated with the order. For example, after successful fulfillment of an order, the order fulfillment engine 206 may transmit a summary of the order to the appropriate retailer(s) 110. The summary may indicate the items purchased, the total value of the items, and in some cases, identifiers of the picker 108 and/or customer 104 associated with the transaction. In one embodiment, the order fulfillment engine 206 pushes transaction and/or order details asynchronously to systems of retailers 110. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In one embodiment, the picker management engine 210 receives a new order from the order fulfillment engine 206. In some implementations, the picker management engine 210 identifies the appropriate retailer 110 to fulfill the order based on one or more parameters, such as the contents of the order, the inventory of the retailers 110, and the proximity to the delivery location. In other embodiments, the retailer 110 can be specified in the order (for example, if selected by the customer when making the order). The picker management engine 210 then identifies one or more appropriate pickers 108 to fulfill the order based on one or more parameters, such as the picker's proximity to the appropriate retailer 110 (and/or to the customer 104), his/her familiarity level with that particular retailer 110, and so on. Additionally, the picker management engine 210 may access a picker database 212 storing information describing each picker 108, such as his/her name, gender, rating, previous shopping history, and so on. The picker management engine 210 transmits the list of items in the order to the picker 108 via the picker mobile application 112. The picker database 212 may also store data describing the sequence in which the pickers 108 picked the items in their assigned orders.

As part of fulfilling an order, the order fulfillment engine 206 and/or picker management engine 210 may access a customer database 214 which stores information describing each customer 104. This information could include each customer's name, address, gender, shopping preferences, favorite items, stored payment instruments, and so on.

To facilitate communication between customers 104 and pickers 108, the online concierge system 102 can include a user interface engine 216 that can generate content for display in user interfaces of the customer mobile application 106 or the picker mobile application 112. The user interface engine 216 can also send additional information via customer mobile application 106 or picker mobile application 112, such as in the form of messages, texts, emails, or push notifications. For example, the user interface engine 216 can generate an ordering user interface for display on the customer mobile application 106 allowing a user to browse, select, and change items to be included in an order. Ordering user interfaces generated by the online concierge system 102 can be configured to display items out of the available items of one or more retailers 110 (for example, retailers 110 within a threshold distance of the customer 104 the ordering user interface will be displayed to).

Figure 3A:
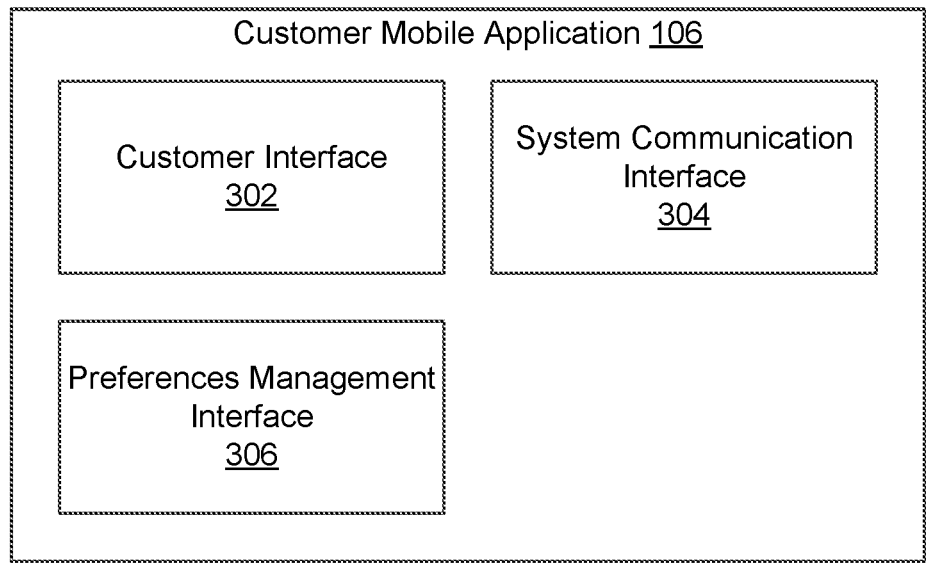
FIG. 3A is a block diagram of the customer mobile application (CMA), according to one embodiment.

FIG. 3A is a block diagram of the customer mobile application (CMA) 106, according to one embodiment. A customer 104 can access the CMA 106 using a client device such as a mobile phone, tablet, laptop, or desktop computer. The CMA 106 may be accessed through an app running on the client device or through a website accessed in a browser. The client device associated with the CMA 106 can be connected to the online concierge system 102 through one or more networks (such as the internet) using wired, wireless, or mobile data technologies. In some embodiments, the CMA 106 includes a customer interface 302, which provides an interactive user interface through which a customer 104 can browse through and select products, place an order, or view recommendations for suggested products. As described above, the user interface module 216 can control content that appears in the customer interface 302 of a CMA 106 and can send user interface information content, layout, or other information to the CMA 106 for display to the customer 104.

The CMA 106 can include a system communication interface 304 which, among other functions can receive inventory information and user interface content from the online concierge system 102 and transmits order information or other customer selections (for example, made via the customer interface 302) to the online concierge system 102. The CMA 106 also includes a preferences management interface 306, which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
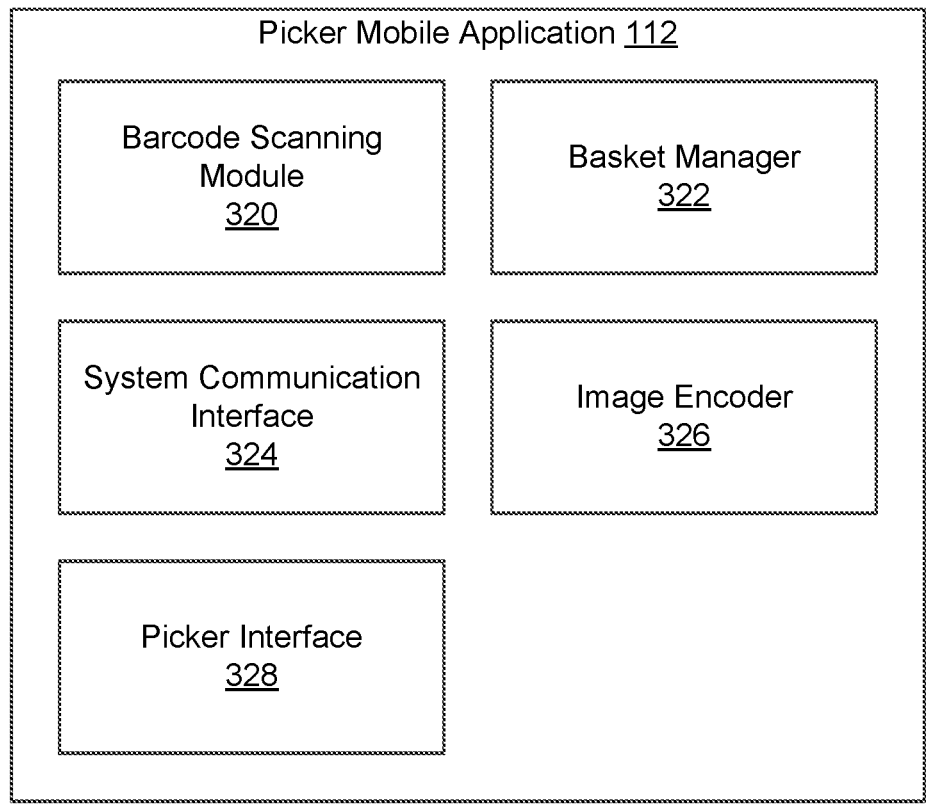
FIG. 3B is a block diagram of the picker mobile application (PMA), according to one embodiment.

FIG. 3B is a block diagram of the picker mobile application (PMA) 112, according to one embodiment. A picker 108 can access the PMA 112 via a mobile client device, such as a mobile phone or tablet. The PMA 112 may be accessed through an app running on the mobile client device or through a website accessed in a browser. The client device associated with the CMA 106 can be connected to the online concierge system 102 through one or more networks (such as the internet) using wired, wireless, or mobile data technologies. In some implementations, the PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 can also include a basket manager 322 which maintains a running record of items collected by the picker 108 for purchase at a retailer 110. This running record of items is commonly known as a "basket." In one embodiment, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out when the picker 108 is making a fulfillment purchase.

After collecting all items for purchase at a retailer 110, the picker 108 can complete the purchase at the retailer 110 using, as noted above, an OCS payment method (such as a credit or debit card associated with the online concierge system 102). In some embodiments, the picker 108 can then provide transaction information for the purchase to the online concierge system 102 including a final basket of items acquired in the fulfillment purchase, total cost of the order to the online concierge system 102 (as described above, the "in-store" price paid by the picker 108 when making a fulfillment may differ from the price offered by the online concierge system 102 to customers 104), a photograph of the receipt, and/or other relevant transaction data. However, this procedure may introduce the possibility for error (such as if the picker 108 accidentally inputs the wrong cost for the fulfillment purchase or forgets/fails to add an item purchased in the fulfillment purchase to the basket).

The PMA 112 also includes a system communication interface 324, which interacts with the online concierge system 102. For example, the system communication interface 324 receives information from the online concierge system 102 about the items of an order, such as when a customer 104 updates an order to include more or fewer items. The system communication interface may receive notifications and messages from the online concierge system 102 indicating information about an order or communications from a customer 104. The system communication interface 324 may send this information to a picker interface 328, which generates a picker user interface to display the received information to the picker 108. In some embodiments, the picker interface 328 is an interactive interface through which pickers 108 may interact with customers 104 and the online concierge service 102 and receive notifications regarding the status of orders they are assigned. For example, pickers 108 may view their orders through the picker interface 328 and indicate when there is an issue with an item in an order, such as the item being out of stock or of poor quality.

Figure 4:
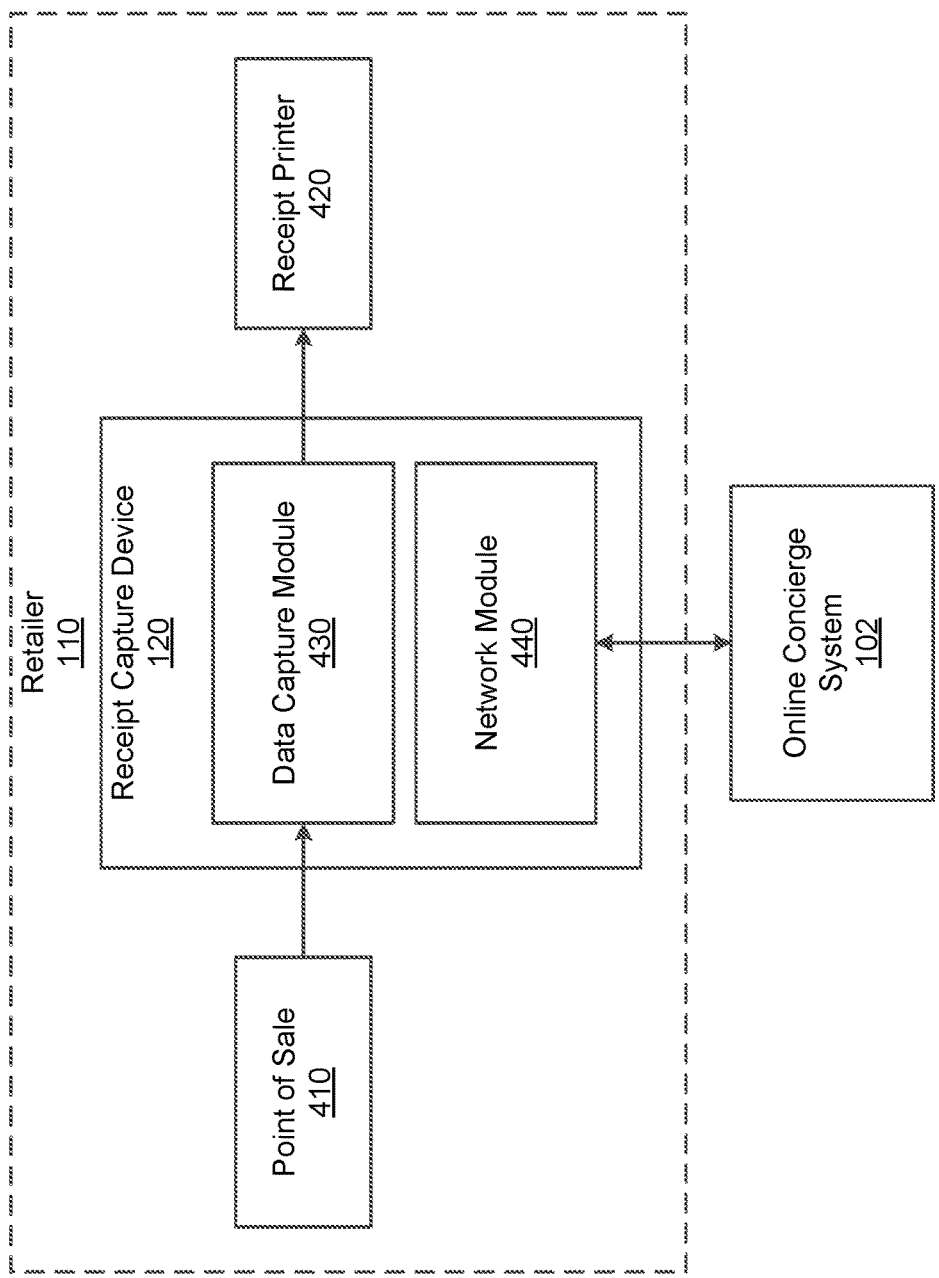
FIG. 4 is a block diagram of a receipt capture device for a retailer, according to one embodiment.

FIG. 4 is a block diagram of a receipt capture device for a retailer, according to one embodiment. The environment 400 of FIG. 4 includes a retailer 110 with a point of sale system 410, a receipt printer 420, and a receipt capture device 120. The receipt capture device 120 of FIG. 4 includes a data capture module 430 and a network module 440 in communication with the online concierge system 102. In some embodiments, the receipt capture device 120 has more or different components than those shown in FIG. 4. In other embodiments, the components shown in FIG. 4 may be combined or removed.

The point of sale (POS) system 410 may be a cash register, terminal, or other device a customer or employee of the retailer 110 uses to process transactions occurring at the retailer 110. For example, a POS system 410 may be a traditional cash register operated by a retailer employee, a self-checkout station operated by a customer of the retailer 110, or a tablet or mobile device with specialized software/peripherals (such as a credit card reader attachment). To process transactions, a POS system 410 may include barcode scanners, calibrated scales, and the like to allow an operator of the POS system 410 to effectively select which products are part of the transaction (by scanning a barcode, entering a product ID, or the like) and determine the correct price for the selected products (for example, by weighting products priced by weight on a calibrated scale). Similarly, the POS system 410 can include functionality to collect and process payment for the transaction (such as a credit card reader or the like). In some embodiments, a POS system 410 provides the buyer and/or the retailer 110 a printed receipt of a transaction processed by the POS system 410 at the time the transaction is completed. To generate the receipt for a transaction, the POS system 410 can transmit receipt data for printing a receipt, including partial transaction information for the transaction (herein, "receipt transaction data") to a corresponding receipt printer 420, which then prints and delivers receipt(s) featuring the receipt transaction data. Receipt printers 420 may require received information to be printed (like receipt transaction data) to be encoded in a specific or proprietary format readable by the receipt printer. Therefore, the POS system 410 may encode the receipt data (including the receipt transaction data) into a receipt printer-readable format (herein, "encoded receipt data") prior to sending the encoded receipt data to the receipt printer 420. In some embodiments, the POS system 410 and the receipt printer 420 are connected via a serial port connection, but alternate connection types may be used in other embodiments.

A receipt printer 420 may receive receipt data from the POS system 410 in an appropriate encoded format and print a physical receipt containing some or all of the received receipt transaction data. Different models of receipt printers 420, in some embodiments, are interchangeable and can connect to (and be connected with) different types of POS systems 410. Similarly, different models or types of receipt printer 420 may have different encoding schemes or formats used for receiving receipt data (and which connected POS systems 410 can encode receipt data sent to that type of receipt printer 420). In some implementations, the receipt printer 420 is integrated or partially integrated with the POS system 410. For example, the receipt printer 420 can be included in the same housing or case as the POS system 410.

The receipt capture device 120, as described above can gather receipt data generated by the POS system 410 and transmit the receipt data to the online concierge system 102 for analysis. For example, a receipt capture device 120 may have serial ports for interfacing with the POS system 410 and the receipt printer 420, a network connection (such as an ethernet port or wireless antenna, or cell radio), a microprocessor for receiving and transmitting receipt data over the serial ports and network connection, and a power source (such as a wall plug or battery). A receipt capture device 420 may be installed at a retailer 110 without modifying the configuration of either the POS system 410 or the receipt printer 420. In some implementations, the receipt capture device 120 functions as a pass-through device that receives receipt data from the POS system 410, stores a temporary copy of the receipt data, and retransmits the receipt data to the receipt printer 420. In some embodiments, the functionality of the POS system 410 and receipt printer 420 is not interrupted by the insertion of a receipt capture device 120 into the system. The receipt capture device 120 can then transmit the intercepted receipt data to the online concierge system 102. The receipt capture device 120 has a data capture module 430 and a network module 440.

The data capture module 430, according to some embodiments, receives receipt data from the POS system 410, stores the receipt data in a memory of the receipt capture device, and then retransmits the receipt data to the receipt printer 420. In some implementations, the data capture module 430 immediately retransmits received receipt data to the receipt printer 420 to minimize the potential for lag or disruption in the operation of the receipt printer 420 due to the receipt capture device 120.

In some implementations, the network module 440 can connect to the online concierge system 102 over a network connection to transmit receipt data captured by the data capture module 430. The network module 440 may transmit receipt data to the online concierge system 102 immediately as it is received (for example, providing a real-time or near real-time stream of receipt data gathered at the receipt capture device 120). In other embodiments, the network module 440 can transmit batches of receipt data covering multiple transactions. For example, the network module 440 can forward receipt data to the online concierge system 102 periodically (such as every 10 minutes or every hour), responsive to receipt data for a threshold number of transactions being captured (such as every 10 transactions), or based on any other suitable criteria. The network module 440 can be connected to the online concierge system 102 using one or more connection methods. Implementations of a receipt capture device 120 may be capable of connecting through a wired connection (such as an ethernet connection), wireless connection (such as using Bluetooth or Wi-Fi), cellular connection (such as using 4G, LTE, or 5G data and a SIM card of the receipt capture device), or a combination of the above methods. In some implementations, some or all transaction information encoded in captured receipt data may contain sensitive information (such as partial credit card numbers, customer names, etc.). Therefore, the network module 440 may encrypt receipt data before transmitting it to the online concierge system 102 for analysis.

FIG. 5 illustrates an example receipt, according to one embodiment. As discussed above, the encoded receipt data sent from a POS system 410 for printing a receipt may contain encoded transaction information (receipt transaction data) for the associated transaction. The receipt 510 of FIG. 5 includes transaction information including a date and time 520 of the transaction, a set of product identifications 530 and associated price information 540 for items purchased in the transaction, a purchase total price 550 for the transaction, and payment information 560 for the transaction. Depending on the type of item (and the pricing structure of the item) at the retailer 110 the associated product identification 530 and price information 540 for the item may contain additional or different information. For example, a quantity and a per-item price may be included in the receipt data for products purchased in multiples (such as the 3 apples in the example of FIG. 5). Similarly, products priced by weight (such as certain types of meat or produce) may include a per-weight price and total weight of the product in addition to the total price paid. Using a receipt capture device 120, this receipt transaction data may be made available to the online concierge system 102 for analysis or archiving without modifications to the operations of POS systems 410 used by a retailer 110.

Figure 6:
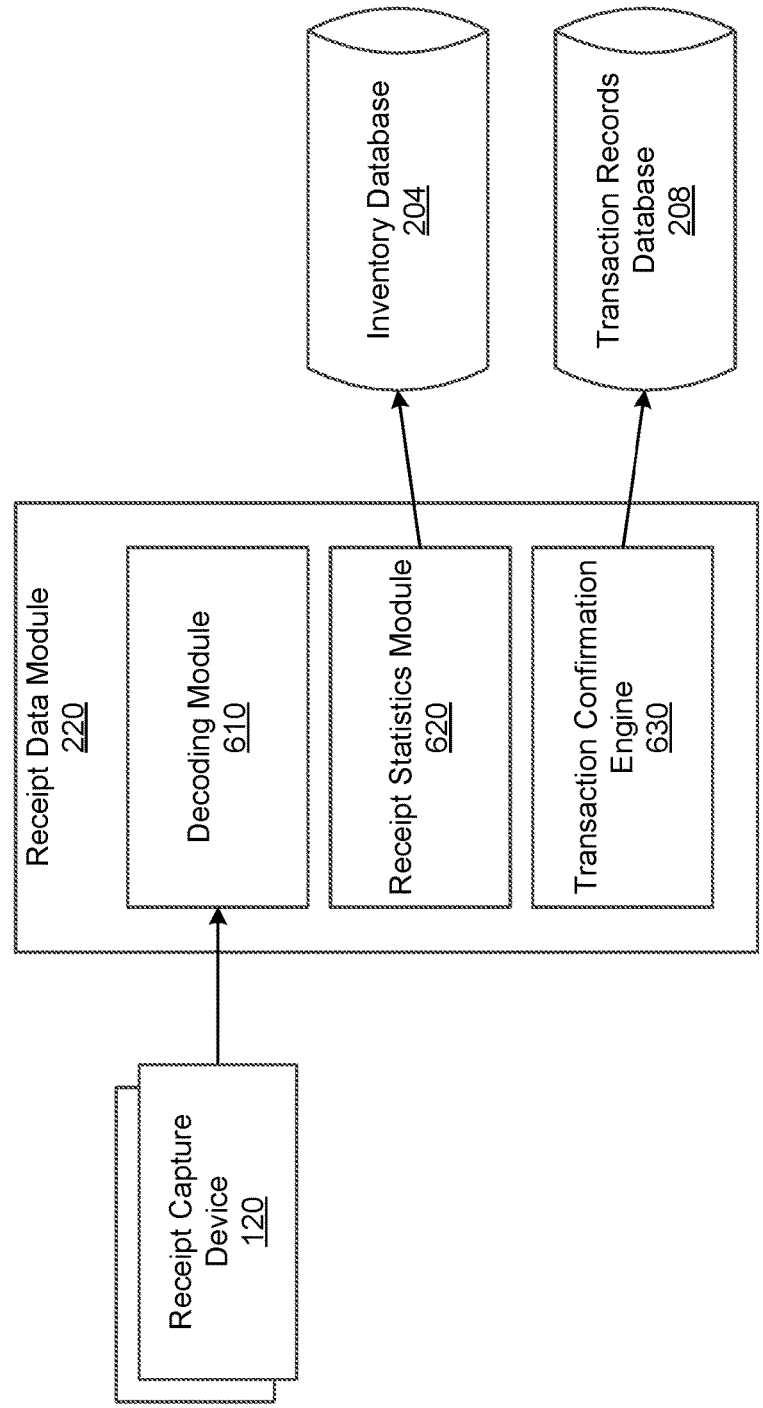
FIG. 6 illustrates an example receipt data module, according to one embodiment.

FIG. 6 illustrates an example receipt data module, according to one embodiment. The environment 600 of FIG. 6 includes a set of receipt capture devices 120 which can send receipt data to a receipt data module 220 of an online concierge system 102, as described above. The receipt data module 220 of FIG. 6 includes a decoding module 610 which receives receipt data from receipt capture devices 120, a receipt statistics module 620 in communication with an inventory database 204 of the online concierge system 102, and a transaction confirmation engine 630 connected to a transaction records database 208 of the online concierge system 102. In some embodiments, the receipt data module 220 has more or different modules than those shown in FIG. 6.

As described above, the receipt data module 220 can receive receipt data from receipt capture devices 120 associated with one or more retailers 110. As described above, each retailer 110 can be associated with one or more receipt capture devices 120 which transmit receipt data to the online concierge system 102 (for example, located at several POS systems 410, checkout lanes, etc. of the retailer 110). In some implementations, the decoding module 610 decodes received receipt data to extract receipt transaction data for transactions occurring at the retailers 110. After receiving the encoded receipt data, the decoding module 610 may determine the encoding format of the receipt data, for example, based on the structure of the receipt data, an encoding format associated with the receipt capture device 120 or retailer 110, and/or the model of receipt printer 420 the receipt data was intended to be printed on. The decoding module 610 then extracts the receipt transaction data included in the encoded receipt data (according to the determined encoding format). In some implementations, the decoding module associates the extracted receipt transaction data with appropriate metadata (including, for example, the receipt capture device 120 or retailer 110 sending the receipt data) and stores the receipt transaction data for further analysis by the receipt data module 220.

As described above, the receipt data module 220 may use receipt transaction data for a variety of purposes. In some implementations, receipt transaction data can be used to generate aggregated statistics for the associated retailer 110 (like a product catalog or list of currently available products). In the embodiment of FIG. 6, the receipt statistics module 620 calculates aggregate statistics for receipt transaction data associated with a specific retailer 110 or receipt capture device 120. As described above, the receipt transaction data generated for a transaction may include a list of products (and associated prices, unit prices, and/or per-weight prices) that were purchased in the transaction. Indications of products included in receipt transaction data (such as a partial product name or product identification number) can be matched with an existing database of potential products or new listings can be created to reflect products found within receipt transaction data. In some implementations, the receipt statistics module 620 aggregates product information from a retailer 110's receipt transaction data to determine a catalog of in-stock products (and associated prices) available at the retailer 110. For example, the receipt statistics module can aggregate receipt transaction data for a retailer 110 over a rolling window (such as 14 or 30 days) to determine the catalog of in-stock products for that retailer 110 based on products recently purchased (and showing up in receipt transaction data).

Product catalogs generated using receipt transaction data may dynamically update to reflect changes or alterations in a retailer 110's available products as they are purchased by customers. For example, seasonal items or new products can be incorporated into the retailers 110 catalog automatically, without requiring the retailer 110 to manually update their catalog. Similarly, products which are discontinued or out of season may be removed from the product catalog after their most recent purchase(s) fall outside the rolling window used by the receipt data module 220. In some implementations, the receipt data module 220 generates a product catalog for a retailer 110 without requiring data from the retailer 110 aside from the receipt transaction data captured by receipt capture devices 120.

Retailer product catalogs generated by the receipt data module 220 may be used to add to or update the inventory database 204 to update the inventory of the retailer 110 in the online concierge system 102. Using the receipt data module 220 can therefore allow customers 104 to access more accurate product catalogs through the online concierge system 102 without requiring the retailer 110 to manually update available products with the online concierge system 102. Additionally, the receipt data module 220 may package generated product catalogs and/or aggregate transaction information or statistics about transactions occurring at the retailer 110 in a transaction report for the retailer 110. In some implementations, this service may be provided to retailers 110 using receipt capture devices 120 independently of the other functions of the online concierge system 102 (such as offering the retailer's products for sale through the online concierge system 102).

In some implementations, receipt transaction data can be used to determine information about individual transactions performed at the associated retailer 110. The transaction confirmation engine 630 may confirm individual transactions reported to the online concierge system 102 from different sources using receipt transaction data. As described above, the online concierge system 102 may rely on pickers 108 to fulfill and/or orders for retailers 110 placed through the online concierge system 102. In some implementations, pickers 108 fulfill orders in part by making fulfillment purchases (buying ordered items at retailers 110) using an OCS payment method (such as a credit or debit card associated with the online concierge system 102). In some implementations, pickers 108 manually track each item included in a fulfillment purchase (for example, using the "basket" system of the picker mobile application 112, as described above) which is then paid for using the system's payment method.

In some implementations, the transaction confirmation engine 630 can confirm that the list of items (or other transaction details) of fulfillment purchases were correctly entered. In some implementations, the transaction confirmation engine can use a timestamp, transaction authorization code, total cost, and/or partial payment information included in receipt transaction data to match a fulfillment purchase with the associated receipt transaction data. For example, receipt transaction data commonly includes the last four digits of a credit or debit card used for the purchase which can be matched to known OCS payment methods associated with pickers 108. To resolve any remaining ambiguities (such as an unrelated purchases made with cards that happen to have the same last four digits as an OCS payment method), the timestamp and/or total cost of the fulfillment purchase (which can be derived from the charge to OCS payment method) can be used to achieve a definitive match. Once receipt transaction data is matched to a fulfillment purchase, product information from the receipt transaction data can be used to confirm the list of products included in the fulfillment purchase. For example, if an item was left out of the picker's manual report of the fulfillment purchase (due to an oversight or intentionally), that item will show up in the matched receipt transaction data and can be added to the transaction record for that fulfillment purchase (stored, in some embodiments, in the transaction records database 208). Similarly, other details of the transaction can be confirmed, such as the total weight (and per-weight price) of any products priced by weight.

Figure 7:
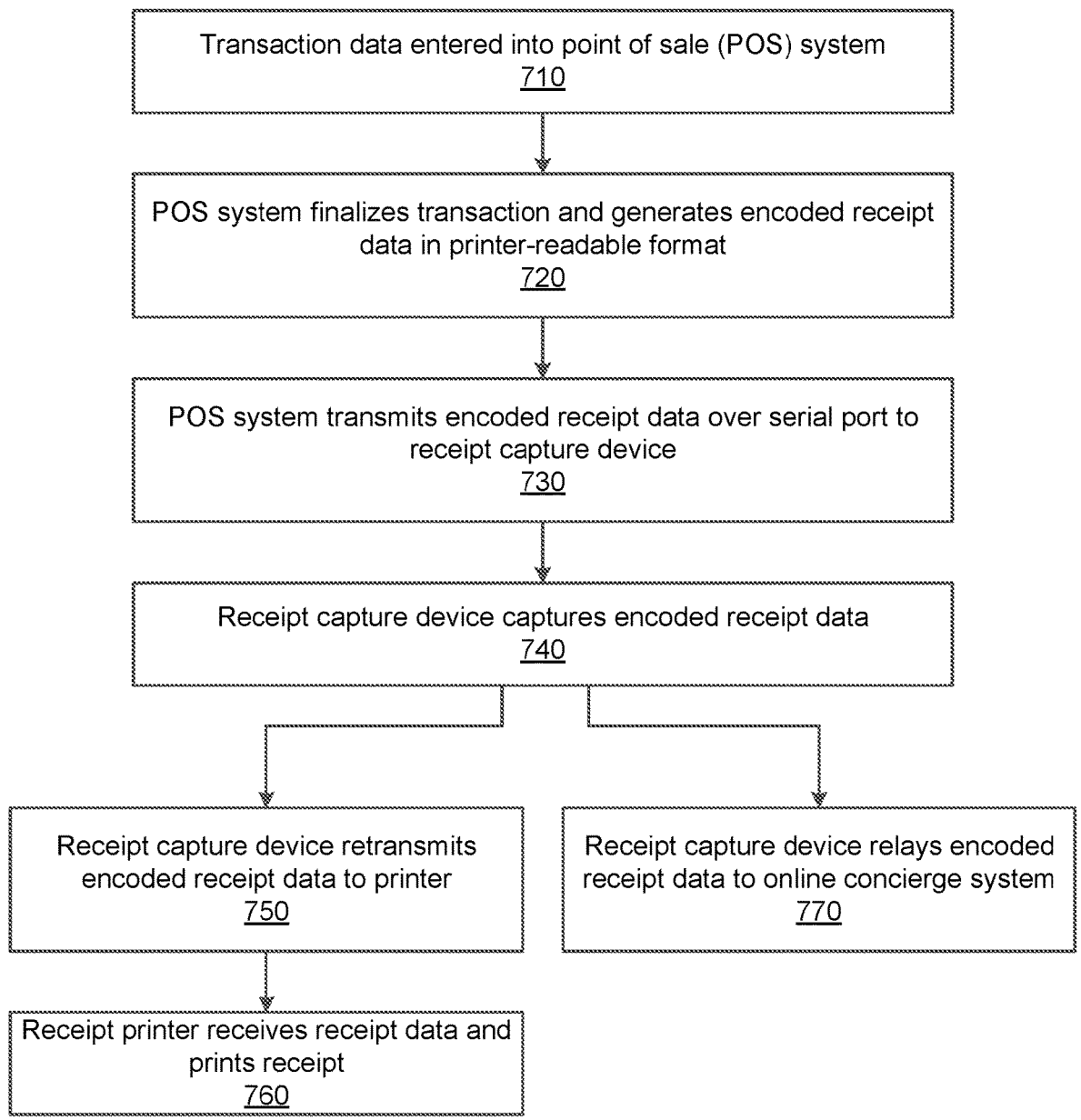
FIG. 7 is a flowchart illustrating a process for capturing receipt data using a receipt capture device, according to one embodiment.

FIG. 7 is a flowchart illustrating a process for capturing receipt data using a receipt capture device, according to one embodiment. The process 700 begins when transaction data is entered 710 into a POS system. For example, through scanning product barcodes, manual entry of product codes, application of discounts, and the like. The POS system can then finalize the transaction (for example, by finalizing the total cost of the transaction and charging the payment method) and generate 720 encoded receipt data containing receipt transaction data for the transaction in a printer-readable format. The POS system can then transmit 730 the encoded receipt data over a serial connection (or other suitable connection) to the receipt capture device. The receipt capture device then captures 740 the encoded receipt data and retransmits 750 the encoded receipt data to the printer. On receiving the encoded receipt data, the printer prints 760 a receipt for the transaction containing the receipt transaction data. Separately the receipt capture device relays 770 the captured encoded receipt data to the online concierge system for future analysis.

Figure 8:
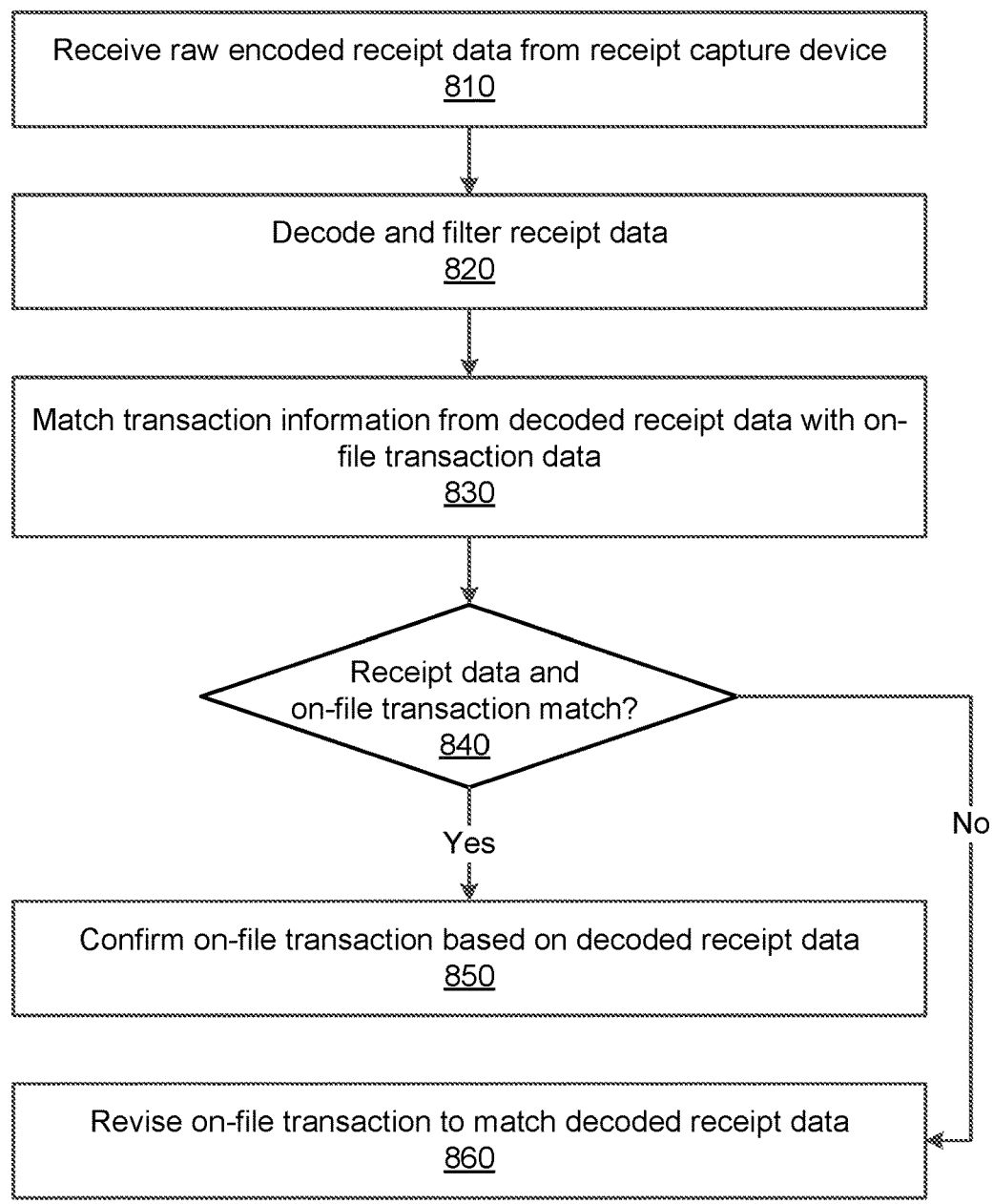
FIG. 8 is a flowchart illustrating a process for using captured receipt data to confirm a transaction, according to one embodiment.

FIG. 8 is a flowchart illustrating a process for using captured receipt data to confirm a transaction, according to one embodiment. The process 800 begins when the receipt data module receives 810 encoded receipt data from a receipt capture device. The receipt data module then decodes 820 and filters the received receipt data to extract receipt transaction data and/or remove receipt data from transactions not associated with the online concierge system. The receipt data module can then match 830 the receipt transaction data from the receipt data with on-file transaction data obtained from other sources. Then, if the receipt data and on-file transaction data match 840, the receipt data module can confirm 850 the on-file transaction based on the decoded receipt data and update the transaction records database to reflect the confirmation. Conversely, if the receipt data and on-file transaction data don't match 840, the on-file transaction data can be revised 860 to match the decoded receipt data.

Figure 9:
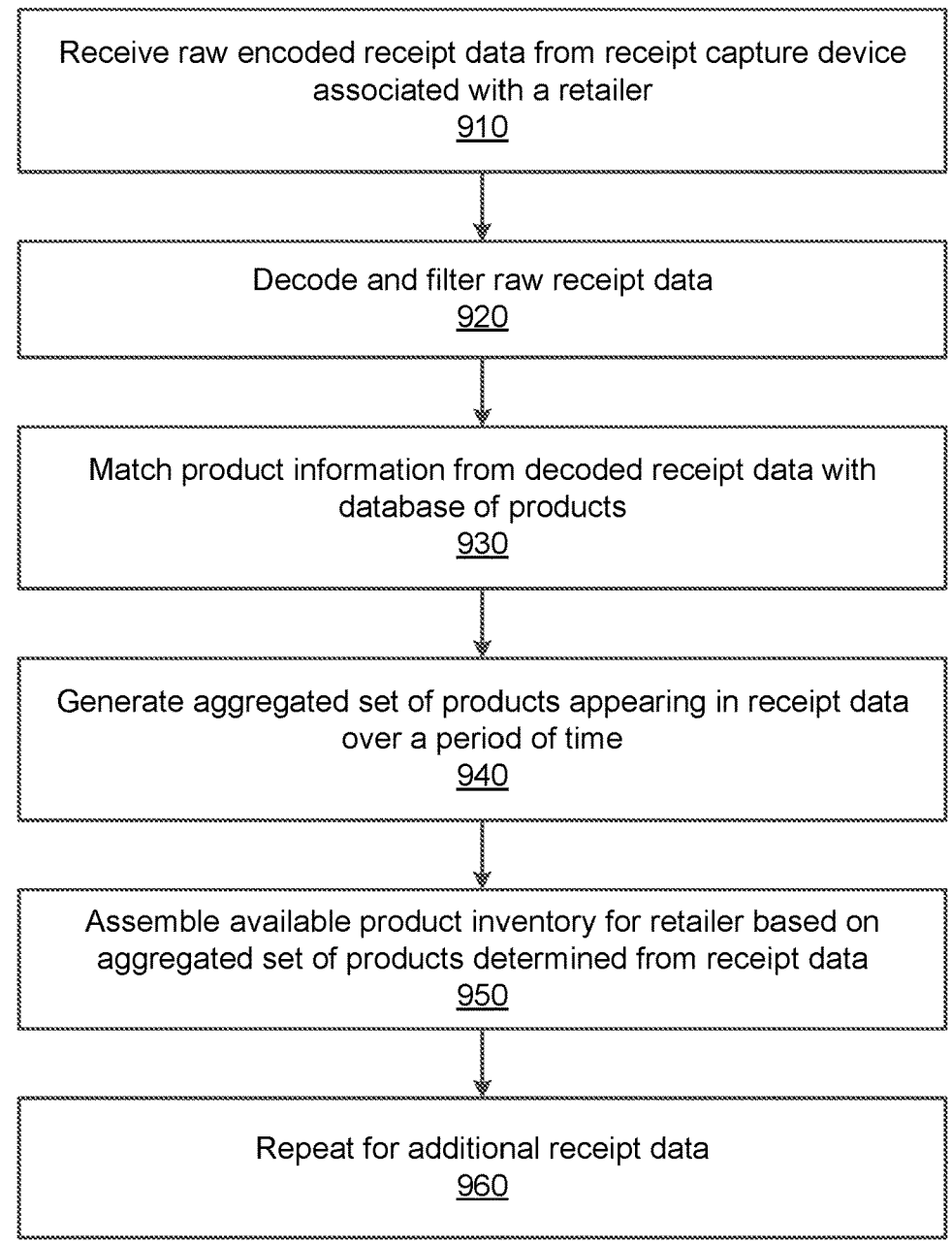
FIG. 9 is a flowchart illustrating a process for using captured receipt data to assemble a product inventory for a retailer, according to one embodiment.

FIG. 9 is a flowchart illustrating a process for using captured receipt data to assemble a product inventory for a retailer, according to one embodiment. The process 900 begins when the receipt data module receives 910 encoded receipt data from a receipt capture device associated with a retailer. The receipt data module then decodes 920 and filters the received receipt data to extract receipt transaction data for transactions occurring at the retailer. The receipt data module then matches 930 product information from the decoded receipt data with a database of potential products and generates 940 an aggregated set of products that have appeared in received receipt data for the retailer over a specified time period (such as the rolling window discussed above). The receipt data module can then assemble 950 an available product inventory/catalog for the retailer including the aggregated set of products. In some implementations, this process can be repeated 960 periodically, or based on new receipt data being received.

Figure 10:
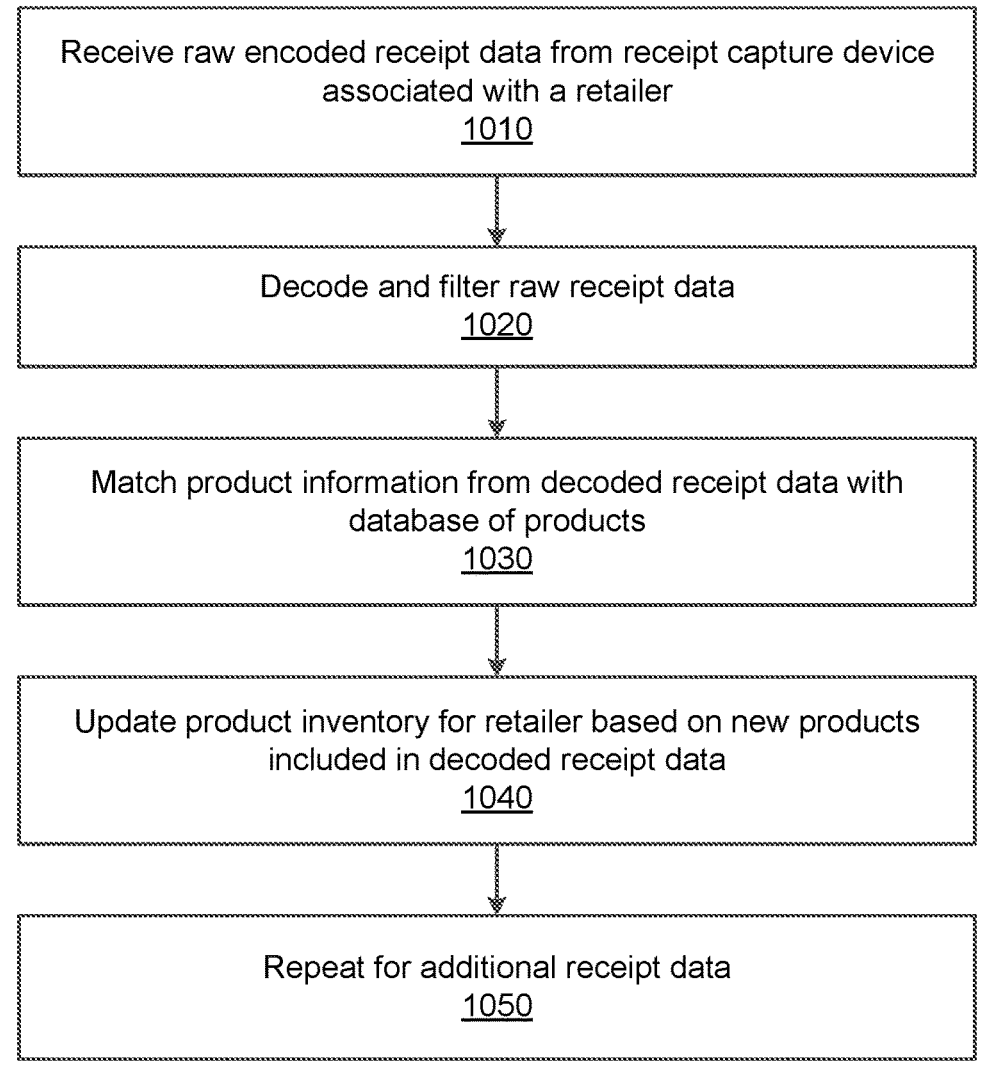
FIG. 10 is a flowchart illustrating a process for using captured receipt data to update a product inventory for a retailer, according to one embodiment.

FIG. 10 is a flowchart illustrating a process for using captured receipt data to update a product inventory for a retailer, according to one embodiment. The process 1000 begins when the receipt data module receives 1010 encoded receipt data from a receipt capture device associated with a retailer. The receipt data module then decodes 1020 and filters the received receipt data to extract receipt transaction data for transactions occurring at the retailer. The receipt data module then matches 1030 product information from the decoded receipt data with a database of potential products and updates 1040 a product inventory for the retailer with any new products appearing in the decoded receipt data. In some implementations, this process can be repeated 950 periodically, or based on new receipt data being received.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   receiving, at an online system, encoded receipt data transmitted by one or more receipt capture devices, each receipt capture device configured to capture encoded receipt data transmitted from a point of sale (POS) system of a first retailer, wherein the one or more receipt capture devices are physical devices that are connected to the POS system, and wherein the online system and the POS system are operated by different entities;
   decoding, by the online system, the encoded receipt data transmitted by the one or more receipt capture devices;
   identifying, from the decoded receipt data, transaction information for a set of transactions associated with the first retailer, the transaction information comprising a set of purchased products purchased in each of the set of transactions associated with the first retailer;
   adjusting, by the online system and responsive to the identification of the set of products, an inventory database to reflect changes in inventory levels of the first retailer of one or more products identified in the transaction information, wherein the adjustment of the inventory database is based on the encoded receipt data transmitted by the one or more receipt capture devices; and
   generating inventory content for display in a user interface for users to place orders of items of the first retailer at the online system, wherein availability of items displayed in the user interface is determined based on the inventory levels determined by the receipt data transmitted by the one or more receipt capture devices.

2. The method of claim 1, wherein decoding the encoded receipt data comprises:
   identifying a type of receipt printer associated with the POS system; and
   determining an encoding format of the encoded receipt data based on the type of receipt printer.

3. The method of claim 1, wherein adjusting the inventory database to reflect changes in inventory levels of the first retailer comprises:
   determining that one or more products identified in the transaction information is not included within the available inventory; and
   adding the one or more unincluded products to the available inventory.

4. The method of claim 1, wherein adjusting the inventory database to reflect changes in inventory levels of the first retailer comprises:
   aggregating transaction information for transactions associated with the first retailer occurring within a rolling time window; and
   determining, from the aggregated transaction information, a set of recently purchased products identified in the aggregated transaction information; and
   generating the available inventory based on the set of recently purchased products.

5. The method of claim 1, wherein identifying transaction information for a set of transactions associated with the first retailer comprises:
  identifying from the decoded receipt data one or more product identifiers; and
  adding one or more products associated with the product identifiers to the set of purchased products.

6. The method of claim 1, further comprising:
  making one or more products of the available inventory available for purchase through the online system.

7. The method of claim 1, further comprising:
  assembling, from the transaction information, a transaction report comprising information for the set of transactions; and
  sending the transaction report to the first retailer.

8. A system comprising:
  a receipt capture device that is a physical device connected to a point of sale (POS) system, the receipt capture device configured to:
    receive, from POS system of a first retailer, encoded receipt data;
    retransmit the encoded receipt data to a receipt printer; and
    relay the encoded receipt data to an online system; and
  an online system, wherein the online system and the POS system are operated by different entities, the online system configured to perform the steps of:
    receiving, from the receipt capture device, encoded receipt data;
    decoding the encoded receipt data;
    identifying, from the decoded receipt data, transaction information for a set of transactions associated with the first retailer, the transaction information comprising a set of purchased products purchased in each of the set of transactions associated with the first retailer; and
    adjusting, by the online system and responsive to the identification of the set of products, an inventory database to reflect changes in inventory levels of the first retailer of one or more products identified in the transaction information, wherein the adjustment of the inventory database is based on the encoded receipt data transmitted by the one or more receipt capture devices; and
    generating inventory content for display in a user interface for users to place orders of items of the first retailer at the online system, wherein availability of items displayed in the user interface is determined based on the inventory levels determined by the receipt data transmitted by the one or more receipt capture devices.

9. The system of claim 8, wherein decoding the encoded receipt data comprises:
  identifying a type of receipt printer associated with the POS system; and
  determining an encoding format of the encoded receipt data based on the type of receipt printer.

10. The system of claim 8, wherein adjusting the inventory database to reflect changes in inventory levels of the first retailer comprises:
  determining that one or more products identified in the transaction information is not included within the available inventory; and
  adding the one or more unincluded products to the available inventory.

11. The system of claim 8, wherein adjusting the inventory database to reflect changes in inventory levels of the first retailer comprises:
  aggregating transaction information for transactions associated with the first retailer occurring within a rolling time window; and
  determining, from the aggregated transaction information, a set of recently purchased products identified in the aggregated transaction information; and
  generating the available inventory based on the set of recently purchased products.

12. The system of claim 8, wherein identifying transaction information for a set of transactions associated with the first retailer comprises:
  identifying from the decoded receipt data one or more product identifiers; and
  adding one or more products associated with the product identifiers to the set of purchased products.

13. The system of claim 8, wherein the steps further comprise:
  assembling, from the transaction information, a transaction report comprising information for the set of transactions; and
  sending the transaction report to the first retailer.

14. A non-transitory computer readable medium configured to store code comprising instructions, the instructions, when executed by one or more processors, cause the one or more processors to perform steps comprising:
  receiving, at an online system, encoded receipt data transmitted by one or more receipt capture devices, each receipt capture device configured to capture encoded receipt data transmitted from a point of sale (POS) system of a first retailer, wherein the one or more receipt capture devices are physical devices that are connected to the POS system, and wherein the online system and the POS system are operated by different entities;
  decoding, by the online system, the encoded receipt data transmitted by the one or more receipt capture devices;
  identifying, from the decoded receipt data, transaction information for a set of transactions associated with the first retailer, the transaction information comprising a set of purchased products purchased in each of the set of transactions associated with the first retailer;
  adjusting, by the online system and responsive to the identification of the set of products, an inventory database to reflect changes in inventory levels of the first retailer of one or more products identified in the transaction information, wherein the adjustment of the inventory database is based on the encoded receipt data transmitted by the one or more receipt capture devices; and
  generating inventory content for display in a user interface for users to place orders of items of the first retailer at the online system, wherein availability of items displayed in the user interface is determined based on the inventory levels determined by the receipt data transmitted by the one or more receipt capture devices.

15. The non-transitory computer readable medium of claim 14, wherein decoding the encoded receipt data comprises:
  identifying a type of receipt printer associated with the POS system; and
  determining an encoding format of the encoded receipt data based on the type of receipt printer.

16. The non-transitory computer readable medium of claim 14, wherein adjusting the inventory database to reflect changes in inventory levels of the first retailer comprises:
- determining that one or more products identified in the transaction information is not included within the available inventory; and
- adding the one or more unincluded products to the available inventory.

17. The non-transitory computer readable medium of claim 14, wherein adjusting the inventory database to reflect changes in inventory levels of the first retailer comprises:
- aggregating transaction information for transactions associated with the first retailer occurring within a rolling time window; and
- determining, from the aggregated transaction information, a set of recently purchased products identified in the aggregated transaction information; and
- generating the available inventory based on the set of recently purchased products.

18. The non-transitory computer readable medium of claim 14, wherein identifying transaction information for a set of transactions associated with the first retailer comprises:
- identifying from the decoded receipt data one or more product identifiers; and
- adding one or more products associated with the product identifiers to the set of purchased products.

19. The non-transitory computer readable medium of claim 14, wherein the steps further comprise:
- making one or more products of the available inventory available for purchase through the online system.

20. The non-transitory computer readable medium of claim 14, wherein the steps further comprise:
- assembling, from the transaction information, a transaction report comprising information for the set of transactions; and
- sending the transaction report to the first retailer.

* * * * *